(12) United States Patent
Singh

(10) Patent No.: US 12,615,235 B2
(45) Date of Patent: Apr. 28, 2026

(54) SYSTEMS, METHODS, AND APPARATUSES FOR IMPROVING CYBERSECURITY BY USING WEBPAGE RENDERING TELEMETRY TO DETECT WEBPAGE ANOMALIES

(71) Applicant: BANK OF AMERICA CORPORATION, Charlotte, NC (US)

(72) Inventor: Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 233 days.

(21) Appl. No.: 18/225,910

(22) Filed: Jul. 25, 2023

(65) Prior Publication Data

US 2025/0039137 A1     Jan. 30, 2025

(51) Int. Cl.
G06F 21/00     (2013.01)
H04L 9/40     (2022.01)

(52) U.S. Cl.
CPC ...... H04L 63/0263 (2013.01); H04L 63/1425 (2013.01)

(58) Field of Classification Search
CPC ........................ H04L 63/0263; H04L 63/1425
See application file for complete search history.

(56) References Cited

U.S. PATENT DOCUMENTS

| | | |
|---|---|---|
| 3,858,182 A | 12/1974 | Delagi |
| 5,197,005 A | 3/1993 | Shwartz |

| | | |
|---|---|---|
| 9,071,637 B2 | 6/2015 | Smith |
| 9,230,105 B1 * | 1/2016 | Satish ..................... G06F 21/56 |
| 9,652,613 B1 | 5/2017 | Marsden |
| 9,800,606 B1 | 10/2017 | Yumer |

(Continued)

FOREIGN PATENT DOCUMENTS

| | | |
|---|---|---|
| AU | 2017200941 A1 | 8/2017 |
| RU | 2755880 C2 | 9/2021 |

OTHER PUBLICATIONS

"Rendering on the Web", https://web.dev/articles/rendering-on-the-web, retrieved Dec. 1, 2023, 15 pages.

*Primary Examiner* — Michael M Lee
(74) *Attorney, Agent, or Firm* — Moore & Van Allen PLLC; Lauren M. Stokes

(57) ABSTRACT

Systems, computer program products, and methods are described herein for improving cybersecurity by using webpage rendering telemetry to detect webpage anomalies. The present invention is configured to identify at least one electronic communication, wherein the at least one electronic communication comprises at least one electronic link; route the at least one electronic communication to a cybersecurity analyzer sandbox; construct, by a cybersecurity analyzer sandbox, a webpage rendering based on the at least one electronic link; collect, by the cybersecurity analyzer sandbox, at least one webpage telemetry data; collect, by the cybersecurity analyzer sandbox, at least one webpage rendering type data; identify at least one baseline webpage rendering; apply at least one of the at least one webpage telemetry data or the at least one webpage rendering type data and the at least one baseline webpage rendering to a webpage anomaly detection model; and generate a cybersecurity score.

18 Claims, 8 Drawing Sheets

(56)  References Cited

U.S. PATENT DOCUMENTS

| | | | | |
|---|---|---|---|---|
| 9,998,480 | B1 | 6/2018 | Gates | |
| 10,482,239 | B1 | 11/2019 | Liu | |
| 10,791,146 | B2 | 9/2020 | Xie | |
| 11,005,866 | B2 | 5/2021 | Nyhuis | |
| 11,134,104 | B2 | 9/2021 | Qureshi | |
| 11,184,401 | B2 | 11/2021 | Crabtree | |
| 11,316,875 | B2 | 4/2022 | Frey | |
| 2016/0285824 | A1* | 9/2016 | Carames | G06F 21/53 |
| 2017/0237750 | A1* | 8/2017 | Park | G06F 21/566 |
| | | | | 726/23 |
| 2018/0152471 | A1* | 5/2018 | Jakobsson | H04L 63/1425 |
| 2019/0104154 | A1* | 4/2019 | Kumar | G06N 20/00 |
| 2019/0141015 | A1 | 5/2019 | Nellen | |
| 2020/0404000 | A1* | 12/2020 | Hayes | G06F 21/567 |
| 2021/0117544 | A1 | 4/2021 | Kurtz | |
| 2021/0160281 | A1* | 5/2021 | Hallaji | H04L 63/1491 |
| 2021/0203693 | A1* | 7/2021 | Clausen | H04L 63/1425 |
| 2021/0288981 | A1 | 9/2021 | Numainville | |
| 2021/0392111 | A1 | 12/2021 | Sole | |
| 2022/0121455 | A1 | 4/2022 | Hoban | |
| 2023/0038671 | A1* | 2/2023 | Weber | H04L 51/212 |
| 2023/0177103 | A1* | 6/2023 | Yamada | G06F 40/106 |
| | | | | 715/234 |
| 2023/0359688 | A1* | 11/2023 | Zhang | G06F 16/958 |

* cited by examiner

140

156

I/O Device

162

164

166

170

160

152

158

Audio Codec

Control Interface

Display Interface

Processor

Receiver

Transcei- ver

Communi- cation Interface

Memory

Memory

Memory

External Interface

168

154

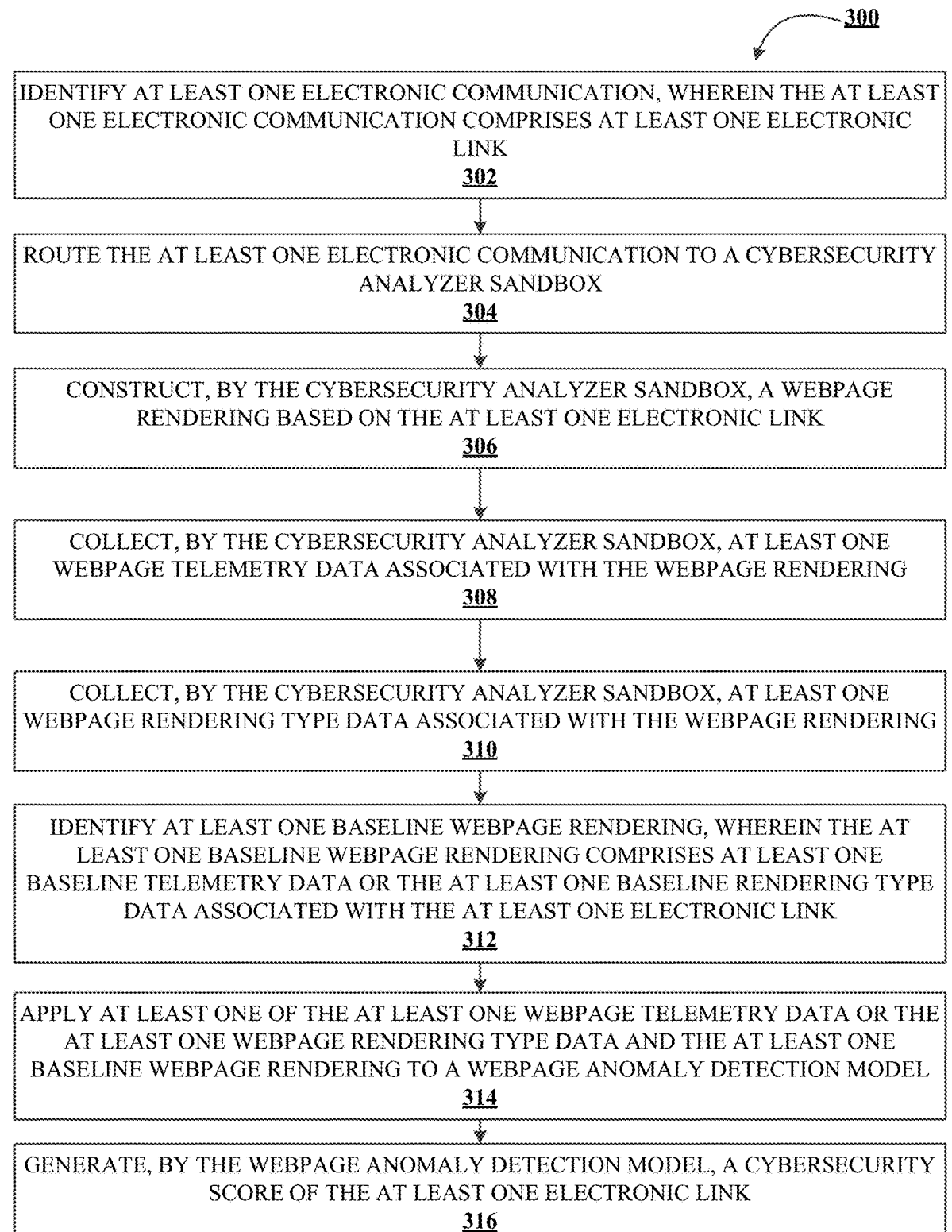

300

IDENTIFY AT LEAST ONE ELECTRONIC COMMUNICATION, WHEREIN THE AT LEAST ONE ELECTRONIC COMMUNICATION COMPRISES AT LEAST ONE ELECTRONIC LINK
302

ROUTE THE AT LEAST ONE ELECTRONIC COMMUNICATION TO A CYBERSECURITY ANALYZER SANDBOX
304

CONSTRUCT, BY THE CYBERSECURITY ANALYZER SANDBOX, A WEBPAGE RENDERING BASED ON THE AT LEAST ONE ELECTRONIC LINK
306

COLLECT, BY THE CYBERSECURITY ANALYZER SANDBOX, AT LEAST ONE WEBPAGE TELEMETRY DATA ASSOCIATED WITH THE WEBPAGE RENDERING
308

COLLECT, BY THE CYBERSECURITY ANALYZER SANDBOX, AT LEAST ONE WEBPAGE RENDERING TYPE DATA ASSOCIATED WITH THE WEBPAGE RENDERING
310

IDENTIFY AT LEAST ONE BASELINE WEBPAGE RENDERING, WHEREIN THE AT LEAST ONE BASELINE WEBPAGE RENDERING COMPRISES AT LEAST ONE BASELINE TELEMETRY DATA OR THE AT LEAST ONE BASELINE RENDERING TYPE DATA ASSOCIATED WITH THE AT LEAST ONE ELECTRONIC LINK
312

APPLY AT LEAST ONE OF THE AT LEAST ONE WEBPAGE TELEMETRY DATA OR THE AT LEAST ONE WEBPAGE RENDERING TYPE DATA AND THE AT LEAST ONE BASELINE WEBPAGE RENDERING TO A WEBPAGE ANOMALY DETECTION MODEL
314

GENERATE, BY THE WEBPAGE ANOMALY DETECTION MODEL, A CYBERSECURITY SCORE OF THE AT LEAST ONE ELECTRONIC LINK
316

ACCESS, BASED ON THE AT LEAST ONE ELECTRONIC LINK, A BASELINE WEBPAGE AT A CURRENT TIME
402

COLLECT AT LEAST ONE BASELINE WEBPAGE TELEMETRY DATA BASED ON ACCESSING THE WEBPAGE
404

GENERATE THE AT LEAST ONE BASELINE WEBPAGE RENDERING BASED ON THE AT LEAST ONE BASELINE WEBPAGE TELEMETRY DATA
406

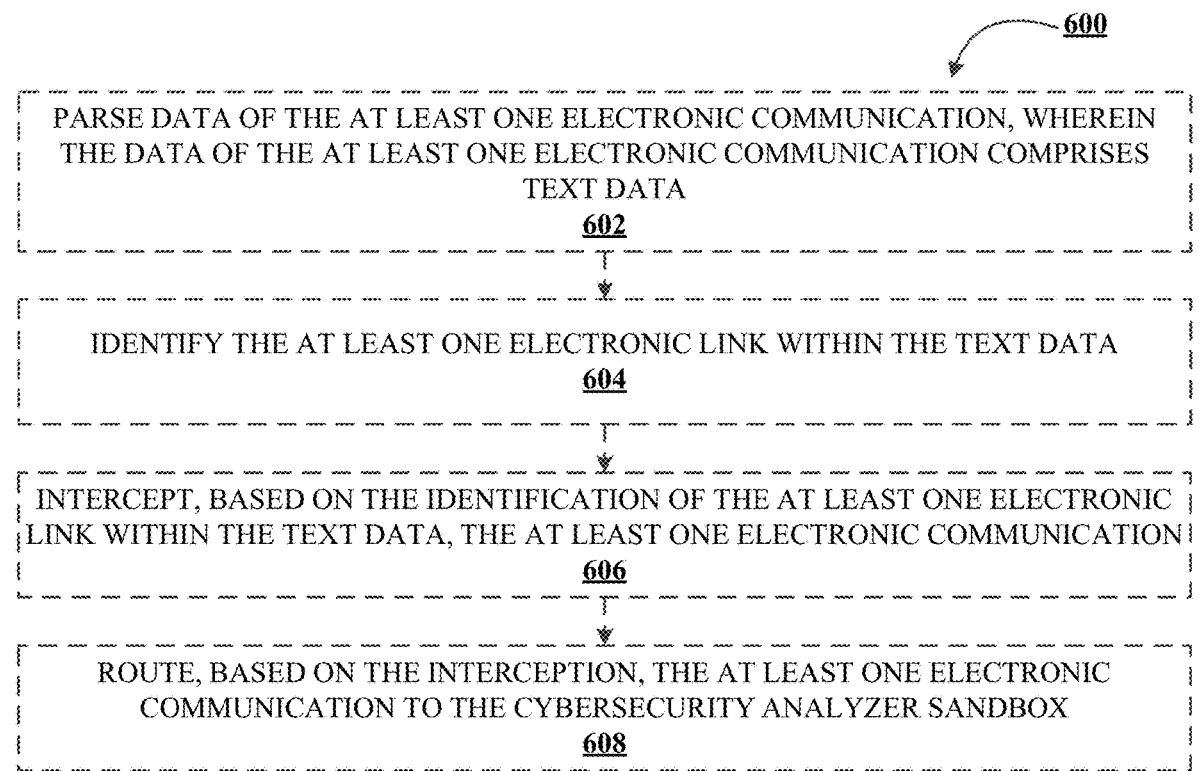

PARSE DATA OF THE AT LEAST ONE ELECTRONIC COMMUNICATION, WHEREIN THE DATA OF THE AT LEAST ONE ELECTRONIC COMMUNICATION COMPRISES TEXT DATA
602

IDENTIFY THE AT LEAST ONE ELECTRONIC LINK WITHIN THE TEXT DATA
604

INTERCEPT, BASED ON THE IDENTIFICATION OF THE AT LEAST ONE ELECTRONIC LINK WITHIN THE TEXT DATA, THE AT LEAST ONE ELECTRONIC COMMUNICATION
606

ROUTE, BASED ON THE INTERCEPTION, THE AT LEAST ONE ELECTRONIC COMMUNICATION TO THE CYBERSECURITY ANALYZER SANDBOX
608

FIGURE 6

SYSTEMS, METHODS, AND APPARATUSES FOR IMPROVING CYBERSECURITY BY USING WEBPAGE RENDERING TELEMETRY TO DETECT WEBPAGE ANOMALIES

FIELD OF THE INVENTION

The present invention embraces a system for improving cybersecurity by using webpage rendering telemetry to detect webpage anomalies.

BACKGROUND

Cybersecurity threats are more prevalent today than ever before and with this increased prevalence, there exists a greater need than ever before to create an automated cybersecurity identification system that can accurately, efficiently and dynamically determine such cybersecurity threats without unduly burdening electronic communications and electronic systems. Thus, there exists a need to implement a system that will address and identify cybersecurity threats easily, quickly, and accurately.

Applicant has identified a number of deficiencies and problems associated with improving cybersecurity by using webpage rendering telemetry to detect webpage anomalies. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for improving cybersecurity by using webpage rendering telemetry to detect webpage anomalies. The system may comprise: a memory device with computer-readable program code stored thereon; at least one processing device, wherein executing the computer-readable code is configured to cause the at least one processing device to perform the following operations: identify at least one electronic communication, wherein the at least one electronic communication comprises at least one electronic link; route the at least one electronic communication to a cybersecurity analyzer sandbox; construct, by a cybersecurity analyzer sandbox, a webpage rendering based on the at least one electronic link; collect, by the cybersecurity analyzer sandbox, at least one webpage telemetry data associated with the webpage rendering; collect, by the cybersecurity analyzer sandbox, at least one webpage rendering type data associated with the webpage rendering; identify at least one baseline webpage rendering, wherein the at least one baseline webpage rendering comprises at least one baseline telemetry data or the at least one baseline rendering type data associated with the at least one electronic link; apply at least one of the at least one webpage telemetry data or the at least one webpage rendering type data and the at least one baseline webpage rendering to a webpage anomaly detection model; and generate, by the webpage anomaly detection model, a cybersecurity score of the at least one electronic link.

In some embodiments, the system may further comprise: access, based on the at least one electronic link, a baseline webpage at a current time; collect at least one baseline webpage telemetry data based on accessing the baseline webpage; and generate the at least one baseline webpage rendering based on the at least one baseline webpage telemetry data.

In some embodiments, the system may comprise: generate a blockchain-based smart contract associated with the webpage anomaly detection model, wherein the blockchain-based mart contract is based on the cybersecurity score of the at least one electronic link; and execute, based on the blockchain-based smart contract, a firewall cybersecurity rule engine based on the cybersecurity score of the at least one electronic link, wherein, in an instance where the cybersecurity score meets or exceeds a cybersecurity score threshold associated with the blockchain-based smart contract, execute the firewall cybersecurity rule engine to disallow access to the at least one electronic link, or wherein, in an instance where the cybersecurity score is below the cybersecurity score threshold associated with the blockchain-based smart contract, execute the firewall cybersecurity rule engine to allow access to the at least one electronic link.

In some embodiments, the webpage anomaly detection model is a long short-term memory (LSTM) neural network.

In some embodiments, the at least one electronic link is at least one hyperlink.

In some embodiments, the system may further comprise: parse data of the at least one electronic communication, wherein the data of the at least one electronic communication comprises text data; identify the at least one electronic link within the text data; intercept, based on the identification of the at least one electronic link within the text data, the at least one electronic communication; and route, based on the interception, the at least one electronic communication to the cybersecurity analyzer sandbox.

In some embodiments, the at least one webpage telemetry data comprises at least one of a webpage rendering performance data associated with at least one of a rendering user device, a web browser, or a geolocation. In some embodiments, the at least one webpage rendering performance data comprises at least one of a time to first byte (TTFB) data, a first paint (FP) data, a first contentful paint (FCP) data, or a time to interactive (TTI) data.

In some embodiments, the at least one webpage rendering type data comprises at least one of a server side rendering (SSR) data, a static SSR data, a SSR with rehydrate data, a client side render (CSR) with prerendering data, or a full CSR rendering data.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
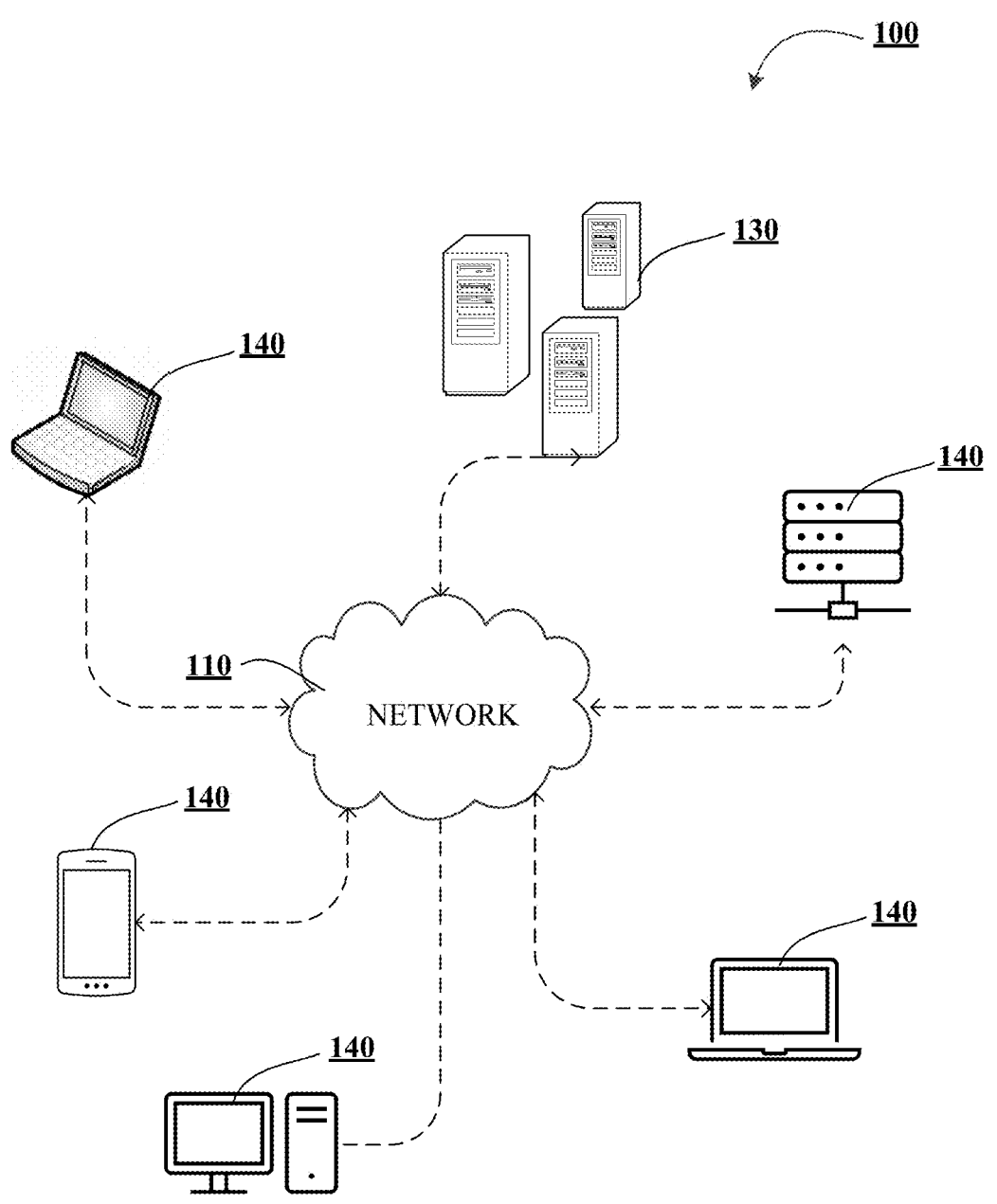
Figure 1B:
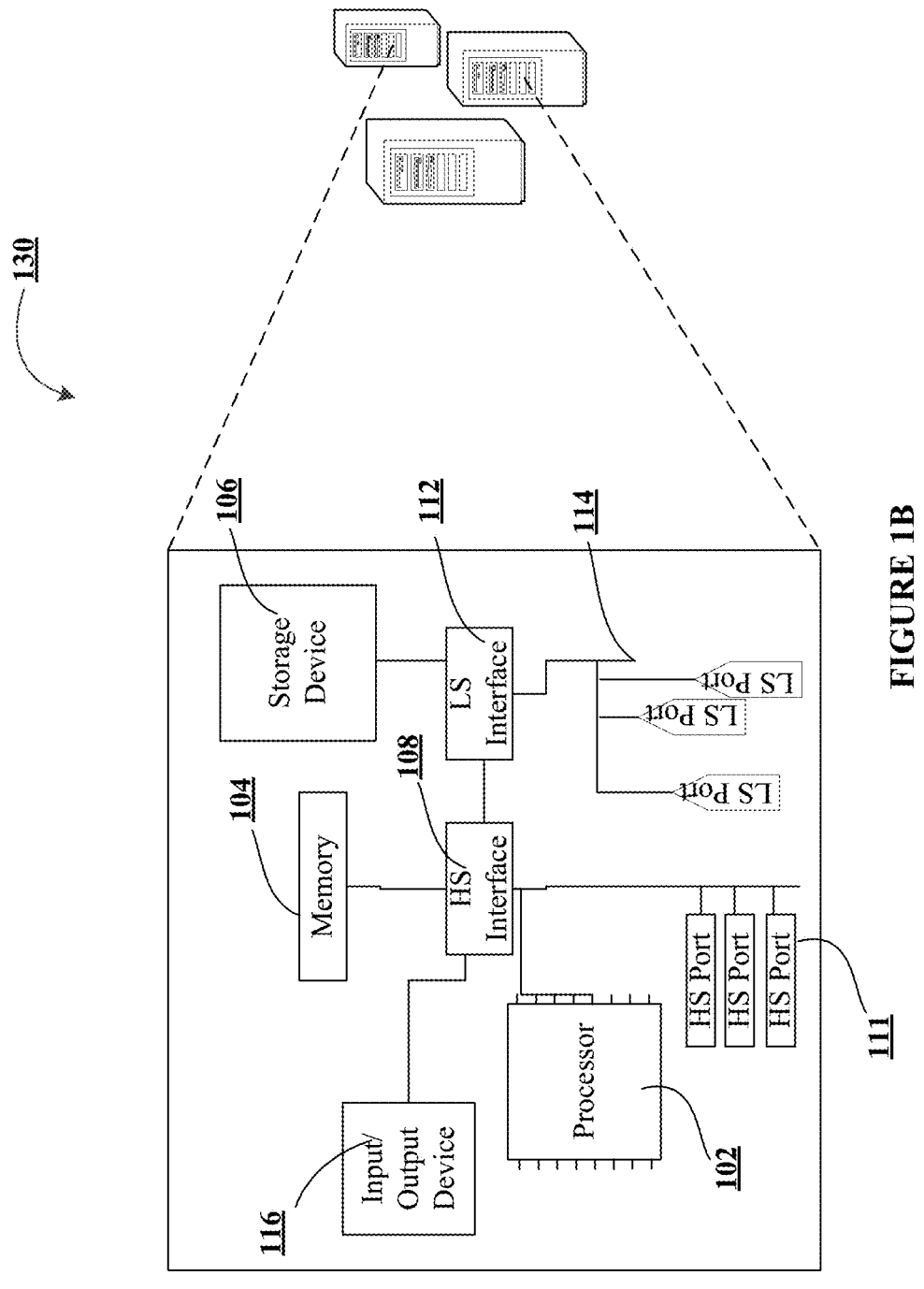
Figure 1C:
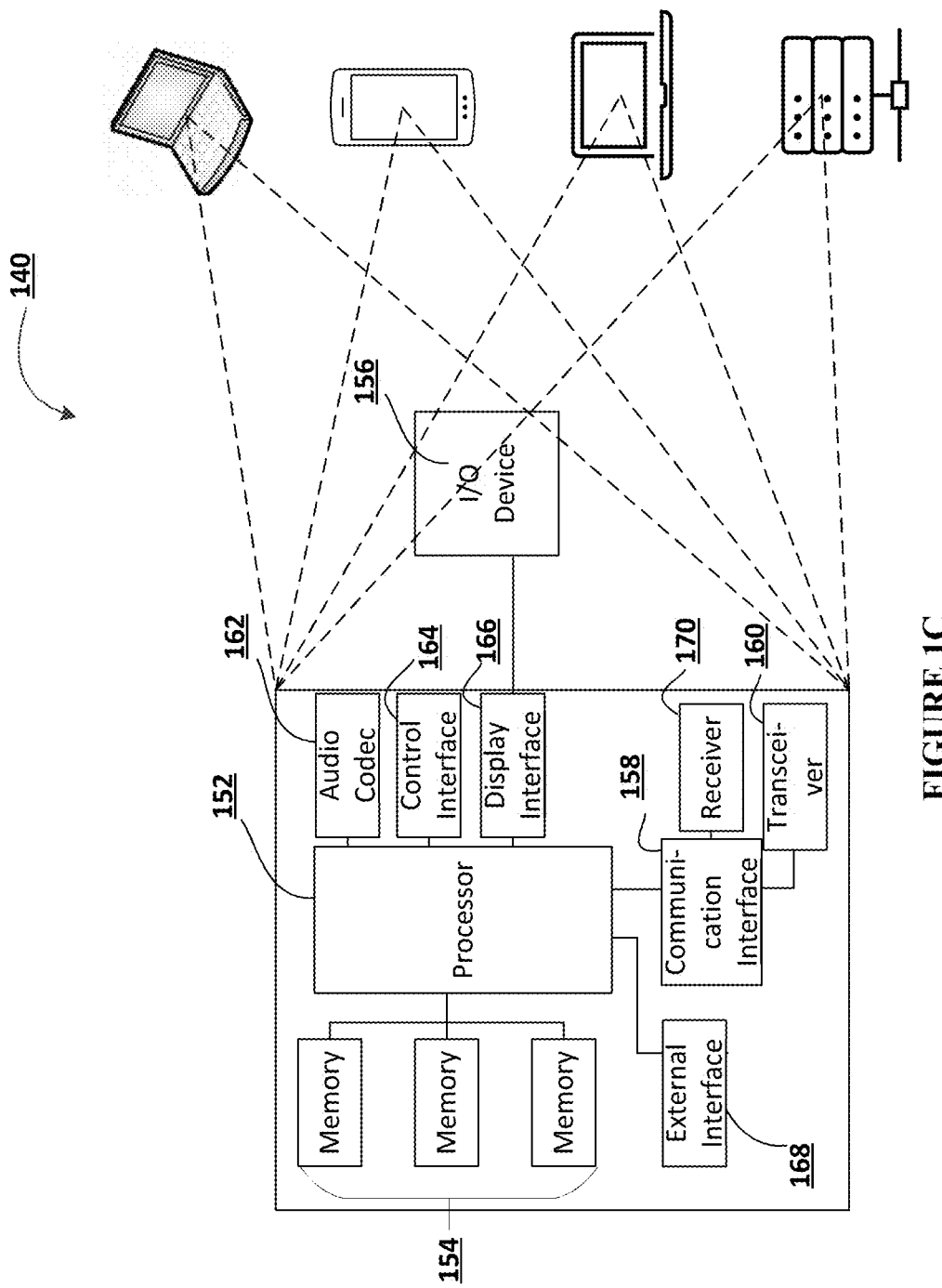
Figure 2:
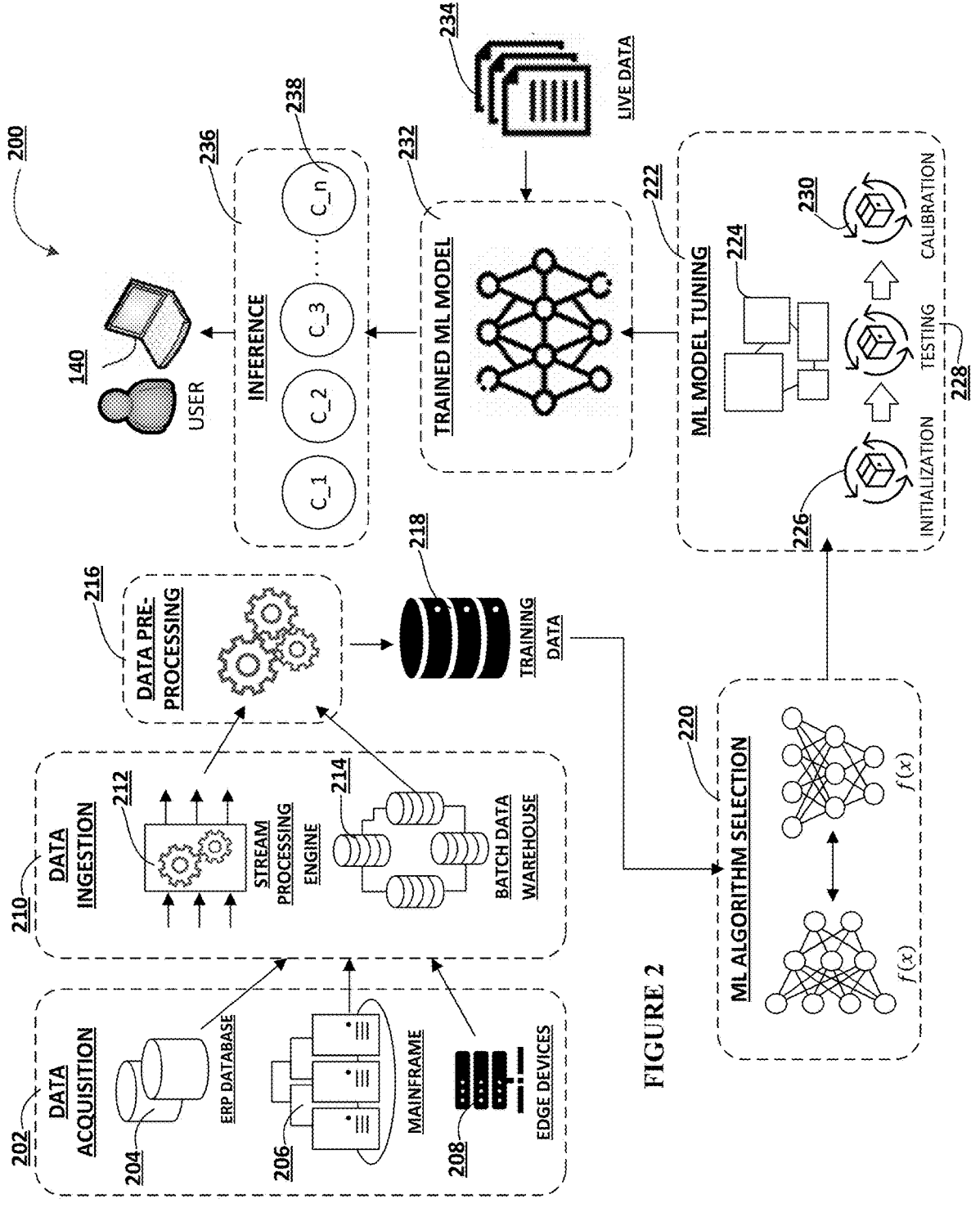
Figure 4:
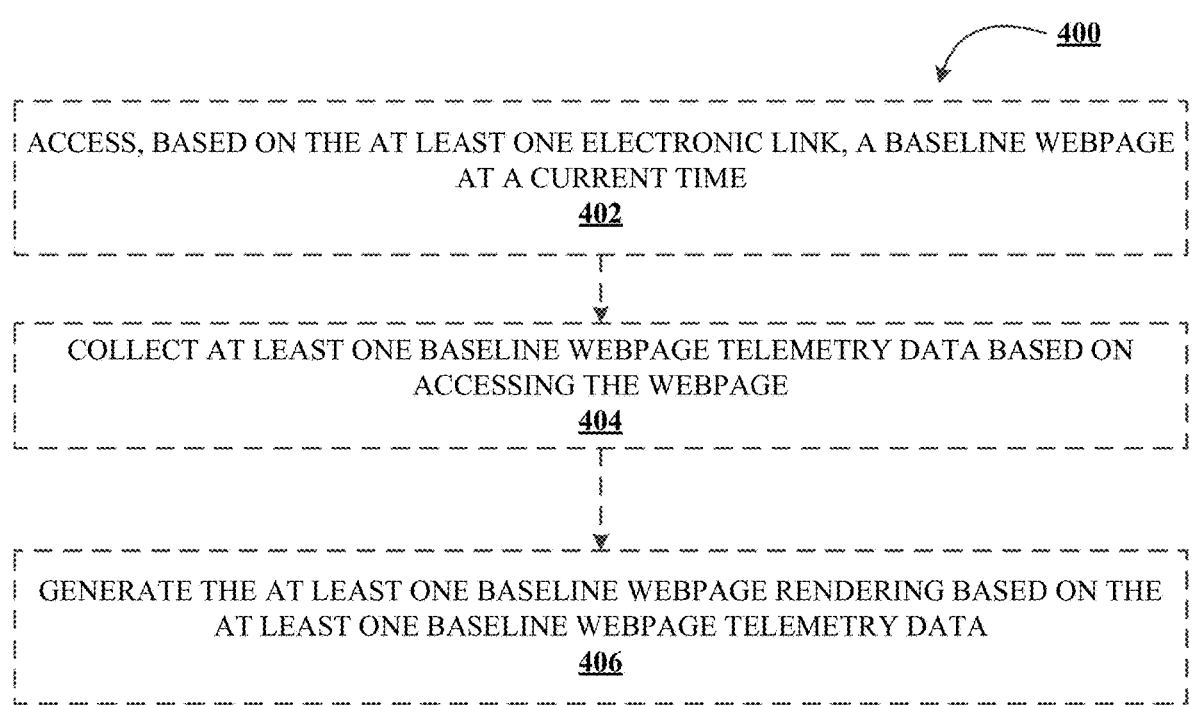
Figure 5:
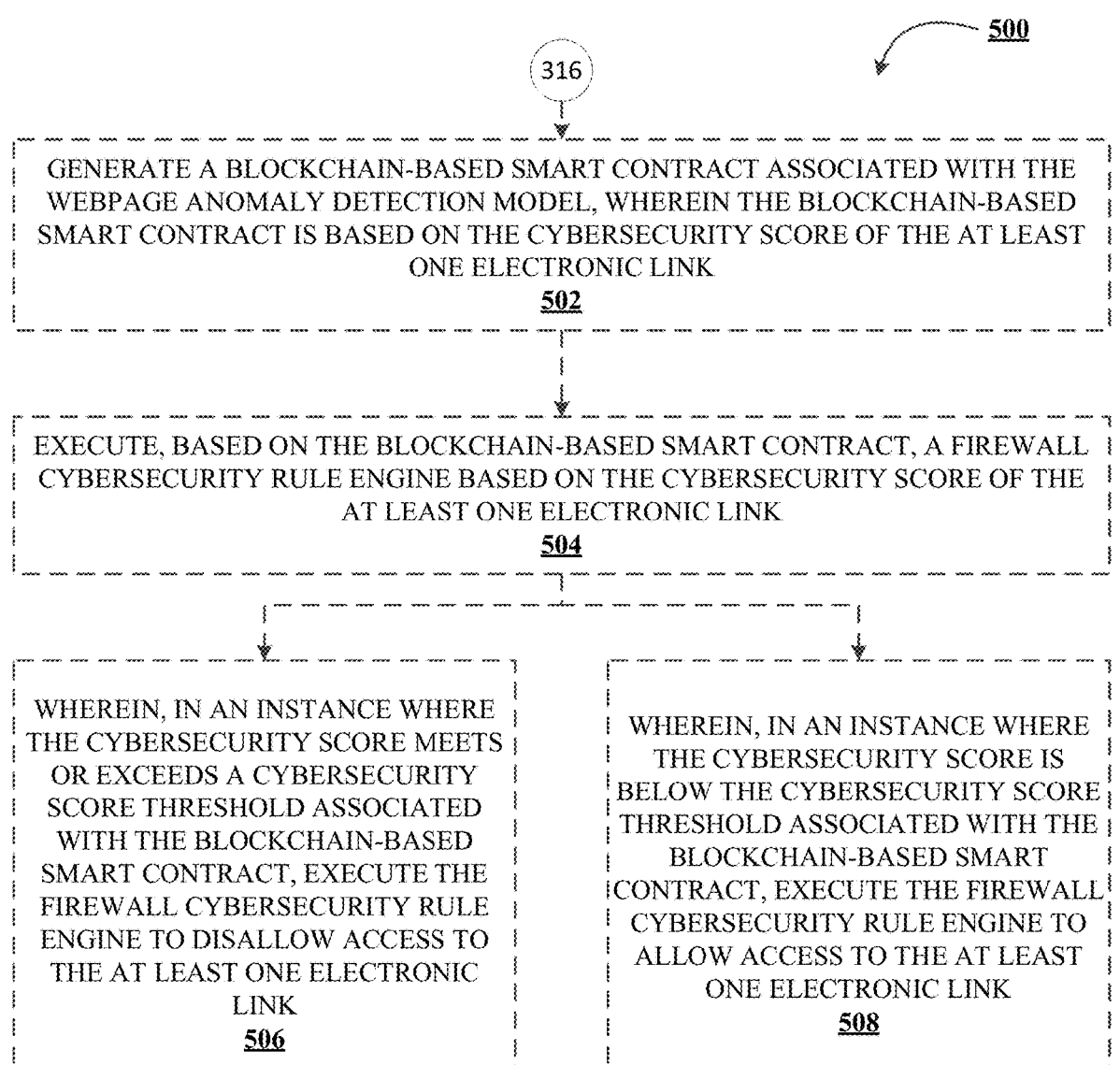

Having thus described embodiments of the invention in general terms, reference will now be made the accompanying drawings, wherein:

FIGS. 1A-1C illustrates technical components of an exemplary distributed computing environment for improving cybersecurity by using webpage rendering telemetry to detect webpage anomalies, in accordance with an embodiment of the invention;

FIG. 2 illustrates an exemplary machine learning (ML) subsystem architecture 200, in accordance with an embodiment of the disclosure;

FIG. 3 illustrates a process flow for improving cybersecurity by using webpage rendering telemetry to detect webpage anomalies, in accordance with an embodiment of the disclosure;

FIG. 4 illustrates a process flow for generating a baseline webpage rendering, in accordance with an embodiment of the disclosure;

FIG. 5 illustrates a process flow for executing a firewall cybersecurity rule engine based on a cybersecurity score, in accordance with an embodiment of the disclosure; and FIG. 6 illustrates a process flow for routing an electronic communication to a cybersecurity analyzer sandbox, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Cybersecurity threats are more prevalent today than ever before and with this increased prevalence, there exists a greater need than ever before to create an automated cybersecurity identification system that can accurately, efficiently and dynamically determine such cybersecurity threats without unduly burdening electronic communications and electronic systems. Thus, there exists a need to implement a system that will address and identify cybersecurity threats easily, quickly, and accurately. For example, such issues arise where bad actors use social engineering techniques within electronic communications (such as emails, text messages, and/or the like) to make the recipient believe the source can be trusted and that the recipient should click or submit a request to access an electronic element (such as a selectable electronic link). Such social engineering tactics and use of fake electronic links which are similar or appear to be the same as trusted websites, webpages, and/or the like, may lead a user to enter in authentication credentials and allow a bad actor access to the user's electronic accounts.

Thus, there exists a need for an invention to accurately, efficiently, and dynamically determine such cybersecurity threats in electronic communications, without unduly burdening and misidentifying electronic communications as comprising cybersecurity threats. Accordingly, the present invention provides for identifying at least one electronic communication (e.g., an email, text message, and/or the like), wherein the at least one electronic communication comprises at least one electronic link (e.g., a hyperlink, an embedded link, and/or the like); and routing the at least one electronic communication to a cybersecurity analyzer sandbox. Further, the invention provides for: constructing, by a cybersecurity analyzer sandbox, a webpage rendering (e.g., for the unauthenticated electronic link of the electronic communication) based on the at least one electronic link; collect, by the cybersecurity analyzer sandbox, at least one webpage telemetry data associated with the webpage rendering; and collecting, by the cybersecurity analyzer sandbox, at least one webpage rendering type data associated with the webpage rendering. Additionally, the invention provides for identifying at least one baseline webpage rendering (e.g., based on an authenticated webpage, website, and/or the like associated with the electronic link), wherein the at least one baseline webpage rendering comprises at least one baseline telemetry data or the at least one baseline rendering type data associated with the at least one electronic link; applying at least one of the at least one webpage telemetry data or the at least one webpage rendering type data and the at least one baseline webpage rendering to a webpage anomaly detection model (e.g., a long short-term memory (LSTM) neural network, machine learning model, and/or the like); and generating, by the webpage anomaly detection model, a cybersecurity score of the at least one electronic link (which may indicate the electronic link's likelihood of composing a cybersecurity threat if selected, clicked on, and/or input authentication credentials).

What is more, the present invention provides a technical solution to a technical problem. As described herein, the technical problem includes a cybersecurity threat identification system. The technical solution presented herein allows for the automatic, dynamic, and efficient identification of cybersecurity threats within electronic communications. In particular, cybersecurity threat identification system is an improvement over existing solutions to the identification of cybersecurity threats, (i) with fewer steps to achieve the solution, thus reducing the amount of computing resources, such as processing resources, storage resources, network resources, and/or the like, that are being used; (ii) providing a more accurate solution to problem, thus reducing the number of resources required to remedy any errors made due to a less accurate solution (e.g., by implementing the automatic collection of telemetry data from both the authenticated baseline webpage and the webpage rendering of the electronic link and comparing both forms of telemetry data by a webpage anomaly detection model, the invention provides for efficient and accurate determination of cybersecurity threats); (iii) removing manual input and waste from the implementation of the solution, thus improving speed and efficiency of the process and conserving computing resources; (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for improving cybersecurity by using webpage rendering telemetry to detect webpage anomalies 100, in accordance with an embodiment of the invention. As shown in FIG. 1A, the distributed computing environment 100 contemplated herein may include a system 130 (i.e., a cybersecurity threat identification system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for improving cybersecurity by using webpage rendering telemetry to detect webpage anomalies, in accordance with an embodiment of the disclosure. In some embodiments, a system (e.g., similar to one or more of the systems described herein with respect to FIGS. 1A-1C and 2) may perform one or more of the steps of process flow 300. For example, a cybersecurity threat identification system (e.g., the system 130 described herein with respect to FIG. 1A-1C) may perform the steps of process 300. In some embodiments, a machine learning model (e.g., such as the ML model shown in FIG. 2) may perform some or all of the steps described in process flow 300.

As shown in block 302, the process flow 300 may include the step of identifying at least one electronic communication, wherein the at least one electronic communication comprises at least one electronic link. For instance, the cybersecurity threat identification system may identify at least one electronic communication received by a user account and/or a user device, whereby such an electronic communication—as used herein—may refer to an email, a direct message, a text message, and/or the like which may have been transmitted over a network (e.g., such as that shown as network 110 of FIG. 1A). In this manner, the cybersecurity threat identification system may track each of the electronic communications sent over a network (such as a network belonging to and/or being used by an entity, like a company or financial institution), received by the network, and/or the like. Further, and in some embodiments, the cybersecurity threat identification system may—after tracking and identifying each of the electronic communications associated with a network—parse the data of the electronic communication in order to determine whether an electronic link is present within the data of the electronic communication.

As used herein, the electronic link of an electronic communication refers to a hyperlink, a web-based link, a digital or electronic reference to a secondary page, and/or the like. Thus, the electronic link(s), as used herein, refers to an identifier, address, and/or clickable/selectable element which may direct and/or redirect a user's device to a secondary webpage, website, page, element, and/or the like from the electronic communication. Thus, and as used herein, the electronic link may comprise a selectable interface element, which may automatically configure the graphical user interface of a user device upon the user "clicking" (or selecting) the electronic link and submitting a request to access the associated secondary webpage, website, page, element, and/or the like.

As understood by a person of skill in the art, the electronic link herein described may refer to electronic links in all forms of web browser, including but not limited to each generating of the world wide web (e.g., Web 1.0, Web 2.0, Web 3.0 and/or the like). As used herein, and based on the version of the world wide web used and considered, the performance data and metrics of each of these webpages (e.g., the webpage rendering, the baseline webpage, and/or the like) may change dynamically based on each of the performance metrics available within each version.

In some embodiments, the cybersecurity threat identification system may automatically identify multiple and/or a plurality of electronic communications at a single time (e.g., at a current time), whereby all are the electronic communications may be transmitted to a user account or a plurality of user accounts at the same time and within the same network associated with the cybersecurity threat identification system. Thus, the cybersecurity threat identification system may identify at least one electronic link (or a plurality of electronic links) within each of the electronic communications. Once the electronic link(s) has been identified, the cybersecurity threat identification system may automatically route the at least one electronic communication to a cybersecurity analyzer sandbox for further analyzation. Such an identification of electronic communications comprising at least one electronic link is described in further detail below with respect to FIG. 6.

As shown in block 304, the process flow 300 may include the step of routing the at least one electronic communication to a cybersecurity analyzer sandbox. For example, the cybersecurity threat identification system may—upon identifying an electronic communication comprising at least one electronic link—automatically route or transmit the electronic communication and its data (including the data of the at least one electronic link) to a cybersecurity analyzer sandbox which may analyze the at least one electronic link in a safe and secure manner. As used herein, the cybersecurity analyzer sandbox refers to a controlled computing environment used for running a code, program, selecting computing elements (e.g., such as the electronic link) and observing the effects of running the code, program, or selectable elements without accessing the actual network. Instead, the cybersecurity analyzer sandbox may be associated with an isolated environment on a network that only mimics the environment associated with the user account that received the electronic communication comprising the at least one electronic link. In this way, the cybersecurity analyzer sandbox is used to test the electronic link in an isolated environment in order to prevent a cybersecurity breach.

In some embodiments, the cybersecurity analyzer sandbox may be stored within the cybersecurity threat identification system; within a network associated with the cybersecurity threat identification system (e.g., within the network storage associated with the user account that received the electronic communication associated with the electronic link); in another network store that is electronically connected to the cybersecurity threat identification system (such as where the cybersecurity threat identification system is stored in a separate environment from the network of the user account that received the electronic communication, and where the cybersecurity analyzer sandbox is stored on a separate network from both the receiving network and the cybersecurity threat identification system's network, and/or where the cybersecurity analyzer sandbox is stored in the cybersecurity threat identification system); and/or the like.

As shown in block 306, the process flow 300 may include the step of constructing, by the cybersecurity analyzer sandbox, a webpage rendering based on the at least one electronic link. For example, the cybersecurity threat identification system may construct—using the cybersecurity analyzer sandbox—a webpage rendering based on the electronic link(s) of the electronic communication. Such a webpage rendering may be based on the cybersecurity analyzer sandbox running the code and accessing the electronic link, which is thereby uploading the data of the electronic link within the cybersecurity analyzer sandbox to show the secondary webpage, website, page, and/or the like of the electronic link.

As shown in block 308, the process flow 300 may include the step of collecting, by the cybersecurity analyzer sandbox, at least one webpage telemetry data associated with the webpage rendering. The cybersecurity threat identification system may—based on the cybersecurity analyzer sandbox—running the code of the electronic link, collect data of the webpage rendering of the electronic link, such that the cybersecurity threat identification system automatically collects webpage telemetry data of the webpage rendering as the webpage rendering is generated within the cybersecurity analyzer sandbox.

In some embodiments, the data that is automatically collected (e.g., the webpage telemetry data) during the generation of the webpage rendering may comprise at least one or a plurality of webpage telemetry data (such as different data types). In some embodiments, the at least one webpage telemetry data may comprise at least one of a webpage rendering performance data (e.g., such as the amount of time it takes to generate and/or upload the webpage rendering, the graphic data of the webpage rendering, and/or the like), the webpage rendering data associated with at least one of a rendering user device (e.g., whether the user device for the webpage rendering is a desktop, mobile device, tablet, and/or the like and how each affects the performance data of the webpage rendering), the type of web browser of the webpage rendering, a geolocation of the webpage rendering (e.g., where the request for accessing the electronic link was submitted from within the cybersecurity analyzer sandbox, where the cybersecurity analyzer sandbox is located at or near the user device that received the electronic communication), the time of the webpage rendering, and/or the like. For instance, and in some embodiments, the performance data of the webpage rendering (e.g., where the request to access the secondary webpage, website, document, and/or the like, of the electronic link) is from a country such as India (which may see high network traffic at a particular time), the cybersecurity threat identification system—through the webpage rendering—may determine webpage rendering performance data comprising the length of time it takes to render the webpage of the electronic link from the particular geolocation of access and at the particular time. Such geospatial and temporal data may then be used by the cybersecurity threat identification system to compare the webpage rendering telemetry data from the cybersecurity analyzer sandbox to a baseline webpage rendering (associated with the authenticated webpage, website, document, and/or the like associated with the electronic link, whereby the electronic link is used to identify what the authenticated webpage, website, and/or the like actually comprises with respect to telemetry data).

In some embodiments, the at least one webpage rendering performance data may comprises at least one of a time to first byte (TTFB) data, a first paint (FP) data, a first contentful paint (FCP) data, a time to interactive (TTI) data, and/or the like. For instance, a TTFB data refers to a metric and/or measurement of time between the submission of the request for the electronic link (e.g., the "clicking" of the electronic link by the cybersecurity analyzer sandbox) and when a first byte is received back (e.g., a first byte of the webpage rendering). Similarly, the FP data refers to the time between the submission of the electronic link and the first pixel rendered in the webpage rendering. The FCP data refers to the time between the first pixel is rendered in the webpage rendering to any part on the webpage rendering's page is rendered (e.g., a full content piece, such as a graphic, image, text, and/or the like). The TTI data additionally refers to the measurement of time between the submission of the request for the electronic link to the time at which the full secondary page is rendered (as the webpage rendering) and the webpage rendering can be interacted with, fully.

As shown in block 310, the process flow 300 may include the step of collecting, by the cybersecurity analyzer sandbox, at least one webpage rendering type data associated with the webpage rendering. For instance, the cybersecurity threat identification system may collect—via the cybersecurity analyzer sandbox—at least one webpage rendering type data which deals with and comprises the types of devices used for rendering the webpage associated with the electronic link, and the associated performance data of rendering the webpage based on the types of devices, the geolocation, the time, and/or the like.

For instance, the at least one webpage rendering type data may comprise at least one of a server side rendering (SSR) data, a static SSR data, a SSR with rehydrate data, a client side render (CSR) with prerendering data, a full CSR rendering data, and/or the like. As used herein, the SSR data may comprise the performance of the server as it generates the secondary webpage, website, document, and/or the like of the electronic link, and the measurement of time the server takes to render the webpage rendering. The static SSR data refers to the performance data (e.g., the measurement of time) it takes when the webpage rendering is pre-rendered (e.g., not on the server and not on the client side), whereby such a pre-rendering may be based on cached data stored by the user device (and/or by the cybersecurity analyzer sandbox) based on previous rendering of the webpage rendering associated with the electronic link. The CSR data, in contrast, refers to the performance data (e.g., the measurement of time) in rendering the webpage rendering using a browser on the client side (i.e., on the receiving side/rendering side of the webpage rendering), whereby the browser is the one collecting the data and generating the webpage rendering. The full CSR rendering data, similarly, refers to the performance data in rendering the full webpage rendering (e.g., which is wholly interactable) on the client side.

In some embodiments, and as described herein, each of the data described herein may change based on the type of device used and/or anticipated for use in submitting the request for the electronic link and generating and/or receiving the webpage associated with the webpage rendering and generating and/or receiving the webpage associated with the authenticated webpage of the electronic link. Similarly, such data may additionally and/or alternatively change based on the geolocation of the requesting device (such as where internet traffic is at its peak or is at its lowest, availability of network connectivity, and/or the like) and/or based on the time of the request for the electronic link/authenticated website.

For instance, and as a non-limiting example, the telemetry data and rendering type data may change based on geolocation and time due to bad actor's and cybersecurity threat actor likely changing their performance metrics for fake websites, webpages, documents, and/or the like based on anticipated traffic (including anticipated traffic from particular geolocations). For example, some bad actors may spend less time and effort optimizing their fake webpages, websites, and/or the like for regions that are unlikely to yield good results (such as results where authentication credentials received would be likely to yield high value accounts). Similarly, the time of access and rendering of the fake webpages, websites, and/or the like may similarly be effected for optimization by bad actors when there are particular windows of time that are less likely to help achieve certain results, such as high yield results.

As shown in block 312, the process flow 300 may include the step of identifying at least one baseline webpage rendering, wherein the at least one baseline webpage rendering comprises at least one baseline telemetry data or the at least one baseline rendering type data associated with the at least one electronic link. For instance, the cybersecurity threat identification system may identify a baseline webpage rendering, which is based on the authenticated webpage, website, document, and/or the like associated with the electronic link.

In some embodiments, the cybersecurity threat identification system may identify an authenticated webpage, website, document, and/or the like based on the identified electronic link. For instance, the cybersecurity threat identification system may itself use a form of the electronic, such as a previously stored authenticated version associated with the electronic link, based on identifying the domain name of the webpage (i.e., the unique identifier of the website, document, and/or the like); the path (i.e., the resource's location on the website, webpage, document, and/or the like); and/or the like.

As shown in block 314, the process flow 300 may include the step of applying at least one of the at least one webpage telemetry data or the at least one webpage rendering type data and the at least one baseline webpage rendering to a webpage anomaly detection model. For example, the cybersecurity threat identification system may apply at least one of the webpage telemetry data and/or the webpage rendering type data for the baseline webpage rendering. Thus, and used herein, the cybersecurity threat identification system may additionally be configured to track and determine—in real time—the telemetry data of the authenticated webpage associated with the electronic link, such as by accessing the authenticated webpage in parallel to the cybersecurity analyzer sandbox generating the webpage rendering and collecting the webpage rendering type data and the webpage telemetry data. In this manner, the cybersecurity threat identification system may identify the baseline webpage rendering (i.e., the rendering of the authenticated webpage as the baseline webpage), and its associated performance data, such as the baseline telemetry data and/or the at least one baseline rendering type data.

Similar to the webpage telemetry data of the electronic link, the baseline telemetry data may additionally comprise at least one of a time to first byte (TTFB) data, a first paint (FP) data, a first contentful paint (FCP) data, a time to interactive (TTI) data, and/or the like for the baseline webpage. Additionally, the baseline rendering type data may comprise at least one of a server side rendering (SSR) data, a static SSR data, a SSR with rehydrate data, a client side render (CSR) with prerendering data, a full CSR rendering data, and/or the like of the baseline webpage.

Thus, and based on the identification of the baseline webpage rendering and the collection of the baseline telemetry data, the baseline rendering type data, the webpage telemetry data, and the webpage telemetry data, the cybersecurity threat identification system may input at least one performance data for the baseline webpage rendering and the webpage rendering to the anomaly detection model.

As used herein, the webpage anomaly detection model may comprise a machine learning model, a long short-term memory (LSTM) neural network, an artificial intelligence (AI) engine, and/or the like. Thus, and as used herein, the webpage anomaly detection model may be pre-trained and configured to determine whether any anomalies are present between the baseline webpage rendering data (e.g., the baseline telemetry data and/or the baseline rendering type data) and the webpage rendering data (e.g., the webpage telemetry data and/or the webpage telemetry data). In some embodiments, and based on the identified/determined anomalies, the cybersecurity threat identification system— via the anomaly detection model—may generate a cybersecurity score of the at least one electronic link, whereby the greater the anomalies present, the higher the cybersecurity score may be.

As shown in block 316, the process flow 300 may include the step of generating, by the webpage anomaly detection anomaly model, a cybersecurity score of the at least one electronic link. For example, and based on the identified/ determined anomalies, the cybersecurity threat identification system—via the anomaly detection model—may generate a cybersecurity score of the at least one electronic link, whereby the greater the anomalies present, the higher the cybersecurity score may be.

FIG. 4 illustrates a process flow for generating a baseline webpage rendering, in accordance with an embodiment of the disclosure. In some embodiments, a system (e.g., similar to one or more of the systems described herein with respect to FIGS. 1A-1C and 2) may perform one or more of the steps of process flow 400. For example, a cybersecurity threat identification system (e.g., the system 130 described herein with respect to FIG. 1A-1C) may perform the steps of process 400. In some embodiments, a machine learning model (e.g., such as the ML model shown in FIG. 2) may perform some or all of the steps described in process flow 400.

In some embodiments, and as shown in block 402, the process flow 400 may include the step of accessing—based on the at least one electronic link—a baseline webpage at a current time (e.g., in real time). For example, the cybersecurity threat identification system may access—based on the at least one electronic link identified in the electronic communication—a baseline webpage at a current time, or in real-time. Thus, and as described herein, the cybersecurity threat identification system may access—based on the data of the at least one electronic link such as the path, the domain, and/or the like—an associated authenticated webpage (i.e., the baseline webpage) that comprises the same and/or similar data. For instance, such same and/or similar data may comprise at least one same or similar domain name, path, and/or the like.

In some embodiments, the cybersecurity threat identification system may additionally and/or alternatively generate and update a database of baseline webpages—along with the associated data such as the domain name, path, and/or the like—which may itself comprise authenticated electronic links for direct access by the cybersecurity threat identification system to the baseline webpage in real time. Thus, and as the cybersecurity threat identification system identifies an electronic link within an electronic communication, the cybersecurity threat identification system may then identify an authenticated webpage as the baseline webpage and access the baseline webpage in parallel to gathering the telemetry data associated with the electronic link of the electronic communication. In some embodiments, such a database of authenticated baseline webpages may be referred to as an authenticated list of baseline webpages. In some embodiments, the authenticated list of baseline webpages may additionally comprise data and/or links of not-yet authenticated baseline webpages (those webpages that have not yet been identified as non-authentic or comprising cybersecurity threats), but that the cybersecurity threat identification system should access and analyze.

Additionally, and in some embodiments, the database of baseline websites may be generated by the cybersecurity threat identification system, whereby the database may comprise an identifier of each of the websites previously visited and/or tracked by the cybersecurity threat identification system. Such identifiers may be used by the cybersecurity threat identification system to identify which websites to continuously collect telemetry data from.

In some embodiments, the cybersecurity threat identification system may additionally and/or alternatively generate a rejected list of webpages, websites, documents, and their associated identifiers and electronic links. In some embodiments, this rejection list may be comprised and/or stored within its own rejected electronic link database, and may be dynamically updated whenever a new electronic link is identified as being a likely cybersecurity threat.

In some embodiments, the cybersecurity threat identification system may additionally and/or alternatively, generate and update clusters the electronic links and associated webpages, websites, documents, and/or the like, such that each of the clusters show relationships between each of the electronic links. For instance, and where an electronic link is sent within an electronic communication and where the electronic communication is transmitted from the same server as at least one other electronic communication, the cybersecurity threat identification system may link, map, and/or cluster these electronic communications to show an underlying relationship. In some embodiments, such a mapping, linking, and/or clustering may be done based on the behavior of the electronic links themselves (e.g., based on the performance data, the server type and/or server identifier, and/or the like), and/or the like.

In some embodiments, and as shown in block 404, the process flow 400 may include the step of collecting at least one baseline webpage telemetry data based on accessing the webpage. Similar to the gathering of the data for the webpage of the electronic link in the electronic communication, the cybersecurity threat identification system may additionally—and in parallel—collect at least one baseline webpage telemetry data based on accessing the baseline webpage in real time and by analyzing the performance data of the baseline webpage as it is loaded. For instance, the cybersecurity threat identification system may collect the baseline webpage rendering data such as the baseline telemetry data and/or the baseline rendering type data like that described above with respect to block 312 of FIG. 3.

In some embodiments, the cybersecurity threat identification system may use the collected baseline webpage telemetry data and/or the baseline webpage rendering data for comparison against the webpage rendering data (e.g., the webpage telemetry data and/or the webpage rendering type data) to determine whether anomalies are present between the baseline webpage and the webpage rendering.

Additionally, and/or alternatively, and as shown in block 406, the process flow 400 may include the step of generating the at least one baseline webpage rendering based on the at least one baseline webpage telemetry data. Thus, and in some embodiments, the cybersecurity threat identification system may generate a baseline webpage rendering based on the collected baseline webpage data discussed above with respect to block 404, whereby the baseline webpage rendering may be used by the cybersecurity threat identification system as a comparison against the webpage rendering associated with the electronic link of the electronic communication. In some embodiments, the cybersecurity threat identification system may save the most recent baseline webpage rendering for the particular rendering device, particular rendering location, and/or particular rendering time within a database, such as the database of baseline websites in order to keep a detailed account of each of the authenticated webpages and their most recent renderings and performance data. Such a detailed account may then, in some embodiments, be used by the cybersecurity threat identification system for future analysis and comparison.

FIG. 5 illustrates a process flow for executing a firewall cybersecurity rule engine based on a cybersecurity score, in accordance with an embodiment of the disclosure. In some embodiments, a system (e.g., similar to one or more of the systems described herein with respect to FIGS. 1A-1C and 2) may perform one or more of the steps of process flow 500. For example, a cybersecurity threat identification system (e.g., the system 130 described herein with respect to FIG. 1A-1C) may perform the steps of process 500. In some embodiments, a machine learning model (e.g., such as the ML model shown in FIG. 2) may perform some or all of the steps described in process flow 500.

In some embodiments, and as shown in block 502, the process flow 500 may include the step of generating a blockchain-based smart contract associated with the webpage anomaly detection model, wherein the blockchain-based smart contract is based on the cybersecurity score of the at least one electronic link. For example, the cybersecurity threat identification system may generate and/or update a blockchain-based smart contract, such that the blockchain-based smart contract automatically and dynamically controls the firewall cybersecurity rule engine based on the output of the webpage anomaly detection model (e.g., the cybersecurity score generated in block 316 of FIG. 3) based on the blockchain-based smart contract's pre-defined rules.

Such a blockchain-based smart contract, as used herein is a program stored on a blockchain that automatically runs once a condition is met (or a pre-defined rule is met, such as a pre-defined rule regarding the cybersecurity score), such as when a cybersecurity score meets or exceeds a cybersecurity score threshold (like that identified in the blockchain-based smart contract). Based on the cybersecurity score and the cybersecurity score threshold of the blockchain-based smart contract, the cybersecurity threat identification system—via the blockchain-based smart contract—may automatically change and/or execute a certain policy, rule, or protocol based on the cybersecurity score (such as allowing or disallowing the access to the electronic link).

In some embodiments, the blockchain-based smart contract may comprise an upper limit and/or a lower limit to show a range of deviation that is allowed by the blockchain-based smart contract for the cybersecurity score. For instance, and where the cybersecurity score is outside of this range, the cybersecurity threat identification system may determine the deviation is too great from the baseline webpage rendering and is likely a cybersecurity threat. In some embodiments, the cybersecurity threat identification system may only consider the lower end or lower limit for the blockchain-based smart contract of the cybersecurity score (indicating that the performance metrics, rendering metrics, rendering type metrics, and/or the like are too low compared to the baseline rendering) as unacceptable, and thus the cybersecurity score does also not meet a cybersecurity score threshold. Thus, the metrics of the electronic link as compared to the actual baseline webpage likely comprises a lower performance in rendering the electronic link webpage (e.g., takes too long, the graphics are lower quality, and/or the like).

In some embodiments, and as shown in block 504, the process flow 500 may include the step of executing—based on the blockchain-based smart contract—a firewall cybersecurity rule engine based on the cybersecurity score of the at least one electronic link. For example, the cybersecurity threat identification system may execute, based on the code of the blockchain-based smart contract and requirements of the blockchain-based smart contract, a firewall cybersecurity rule engine to allow and/or disallow the electronic link for a user account (such as the user account that received the electronic communication and/or all the user accounts within the network and associated with the network that received the electronic communication).

In some embodiments, and as shown in block 506, the process flow 500 include the step of executing—in an instance where the cybersecurity score meets or exceeds a cybersecurity score threshold associated with the blockchain-based smart contract—the firewall cybersecurity rule engine to disallow access to the at least one electronic link. For instance, the cybersecurity threat identification system may execute a firewall cybersecurity rule engine to disallow access and/or allow access to the at least one electronic link based on a determination of whether the cybersecurity score generated by the cybersecurity threat identification system—via the webpage anomaly detection model and analyzed by the blockchain-based smart contract—meets or exceeds the cybersecurity score threshold. As used herein, the execution of the firewall cybersecurity rule engine comprises an automatic carrying out of a firewall within the network that received the electronic communication, whereby the rules of the firewall cybersecurity rule engine will be used to determine which webpages, websites, documents, and/or the like that the network will allow access to. Thus, and based on the instance where the cybersecurity score meets and/or exceeds the cybersecurity score threshold (and/or wherein the cybersecurity score is outside the range of acceptance cybersecurity score thresholds), the cybersecurity threat identification system may execute the firewall cybersecurity rule engine to disallow access to the at least one electronic link that has been identified as a likely cybersecurity threat. Such a disallowance may comprise a disallowance for only certain user accounts within the network (e.g., the user account that received the electronic communication comprising the electronic link) and/or may comprise a disallowance for all the user accounts within the network to the electronic link.

In some embodiments, and as shown in block 508, the process flow 500 may include the step of executing—in an instance where the cybersecurity score is below the cyber-security score threshold associated with the blockchain-based smart contract—the firewall cybersecurity rule engine to allow access to the at least one electronic link. In contrast to the automatic disallowance of access to the at least one electronic link, and where the cybersecurity score associated with the electronic is below the cybersecurity score threshold (and/or within the range of acceptance cybersecurity score thresholds), the cybersecurity threat identification system may execute the firewall cybersecurity rule engine to allow access to the electronic link.

FIG. 6 illustrates a process flow for routing an electronic communication to a cybersecurity analyzer sandbox, in accordance with an embodiment of the disclosure. In some embodiments, a system (e.g., similar to one or more of the systems described herein with respect to FIGS. 1A-1C and 2) may perform one or more of the steps of process flow 600. For example, a cybersecurity threat identification system (e.g., the system 130 described herein with respect to FIG. 1A-1C) may perform the steps of process 600. In some embodiments, a machine learning model (e.g., such as the ML model shown in FIG. 2) may perform some or all of the steps described in process flow 600.

In some embodiments, and as shown in block 602, the process flow 600 may include the step of parsing data of the at least one electronic communication, wherein the data of the at least one electronic communication comprises text data. For example, the cybersecurity threat identification system may parse the data of the electronic communication(s) received within the network and from outside the network, whereby such data parsed may comprise at least one of text data, graphic(s), image(s), sender and recipient data (identifiers and addresses), and/or the like. In some embodiments, the cybersecurity threat identification system may parse all the data and analyze each of the types of data, individually in order to identify whether there is at least one electronic link present. In some embodiments, electronic links may be comprised within text (such as a hyperlink within the electronic communication) or electronic links may be embedded in media data such that it is harder to tell by a user that an electronic link is present (e.g., such as a hyperlink embedded within an image or graphic), and/or the like. Based on the identification and parsing of each piece of data within the electronic communication, the cybersecurity threat identification system may identify each of the electronic link(s) present within each electronic communication received within and by a network.

In some embodiments, and as shown in block 604, the process flow 600 may include the step of identifying the at least one electronic link within the text data. For example, the cybersecurity threat identification system may identify hyperlinks within the text data of the electronic communication, such as an HTML address, HTTP address, and/or the like. In some embodiments, an electronic communication may comprise multiple electronic links, and each must be individually analyzed by the cybersecurity threat identification system within the cybersecurity analyzer sandbox.

In some embodiments, and as shown in block 606, the process flow 600 may include the step of intercepting, based on the identification of the at least one electronic link within the text data, the at least one electronic communication. In some embodiments, and where there are no electronic links present (either as text, embedded, and/or the like) within an electronic communication, the cybersecurity threat identification system may automatically intercept these electronic communications in order to further analyze the electronic link(s) within the electronic communication(s) in order to determine whether a cybersecurity threat is present. Such an interception may comprise a blocking of the electronic communication from the originally identified recipient's account (such as the recipient's email inbox) until the cybersecurity threat likelihood has been determined.

In some embodiments, and as shown in block 608, the process flow 600 may include the step of routing, based on the interception (e.g., of block 606), the at least one electronic communication to the cybersecurity analyzer sandbox. For instance, the cybersecurity threat identification system may route—automatically and upon the identification of at least one electronic link—the entire electronic communication to the cybersecurity analyzer sandbox for further analysis, such as the analysis described in FIG. 3 above.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable program-mable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-ori-ented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for improving cybersecurity by using webpage rendering telemetry to detect webpage anomalies, the system comprising:

a memory device with computer-readable program code stored thereon;

at least one processing device, wherein executing the computer-readable code is configured to cause the at least one processing device to perform the following operations:

identify at least one electronic communication, wherein the at least one electronic communication comprises at least one electronic link;

route the at least one electronic communication to a cybersecurity analyzer sandbox;

construct, by the cybersecurity analyzer sandbox, a webpage rendering based on the at least one electronic link;

collect, by the cybersecurity analyzer sandbox, at least one webpage telemetry data associated with the webpage rendering;

collect, by the cybersecurity analyzer sandbox, at least one webpage rendering type data associated with the webpage rendering;

identify at least one baseline webpage rendering, wherein the at least one baseline webpage rendering comprises at least one baseline telemetry data or at least one baseline rendering type data associated with the at least one electronic link;

apply at least one of the at least one webpage telemetry data or the at least one webpage rendering type data and the at least one baseline webpage rendering to a webpage anomaly detection model;

generate, by the webpage anomaly detection model, a cybersecurity score of the at least one electronic link;

generate a blockchain-based smart contract associated with the webpage anomaly detection model, wherein the blockchain-based smart contract is based on the cybersecurity score of the at least one electronic link; and execute, based on the blockchain-based smart contract, a firewall cybersecurity rule engine based on the cyber-security score of the at least one electronic link, wherein, in an instance where the cybersecurity score meets or exceeds a cybersecurity score threshold associated with the blockchain-based smart contract, execute the firewall cybersecurity rule engine to disallow access to the at least one electronic link, or wherein, in an instance where the cybersecurity score is below the cybersecurity score threshold associated with the blockchain-based smart contract, execute the firewall cybersecurity rule engine to allow access to the at least one electronic link.

2. The system of claim 1, the system further comprising:

access, based on the at least one electronic link, a baseline webpage at a current time;

collect at least one baseline webpage telemetry data based on the accessing the baseline webpage; and generate the at least one baseline webpage rendering based on the at least one baseline webpage telemetry data.

3. The system of claim 1, wherein the webpage anomaly detection model is a long short-term memory (LSTM) neural network.

4. The system of claim 1, wherein the at least one electronic link is at least one hyperlink.

5. The system of claim 1, the system further comprising:

parse data of the at least one electronic communication, wherein the data of the at least one electronic communication comprises text data;

identify the at least one electronic link within the text data;

intercept, based on the identifying of the at least one electronic link within the text data, the at least one electronic communication; and route, based on the interception, the at least one electronic communication to the cybersecurity analyzer sandbox.

6. The system of claim 1, wherein the at least one webpage telemetry data comprises at least one of a webpage rendering performance data associated with at least one of a rendering user device, a web browser, or a geolocation.

7. The system of claim 6, wherein the at least one webpage rendering performance data comprises at least one of a time to first byte (TTFB) data, a first paint (FP) data, a first contentful paint (FCP) data, or a time to interactive (TTI) data.

8. The system of claim 1, wherein the at least one webpage rendering type data comprises at least one of a server side rendering (SSR) data, a static SSR data, a SSR with rehydrate data, a client side render (CSR) with prerendering data, or a full CSR rendering data.

9. A computer program product for improving cybersecurity by using webpage rendering telemetry to detect webpage anomalies, wherein the computer program product comprises at least one non-transitory computer-readable medium having computer-readable program code portions embodied therein, the computer-readable program code portions which when executed by a processing device are configured to cause the processor to perform the following operations:

identify at least one electronic communication, wherein the at least one electronic communication comprises at least one electronic link;

route the at least one electronic communication to a cybersecurity analyzer sandbox;

construct, by the cybersecurity analyzer sandbox, a webpage rendering based on the at least one electronic link;

collect, by the cybersecurity analyzer sandbox, at least one webpage telemetry data associated with the webpage rendering;

collect, by the cybersecurity analyzer sandbox, at least one webpage rendering type data associated with the webpage rendering;

identify at least one baseline webpage rendering, wherein the at least one baseline webpage rendering comprises at least one baseline telemetry data or at least one baseline rendering type data associated with the at least one electronic link;

apply at least one of the at least one webpage telemetry data or the at least one webpage rendering type data and the at least one baseline webpage rendering to a webpage anomaly detection model;

generate, by the webpage anomaly detection model, a cybersecurity score of the at least one electronic link;

generate a blockchain-based smart contract associated with the webpage anomaly detection model, wherein the blockchain-based smart contract is based on the cybersecurity score of the at least one electronic link; and execute, based on the blockchain-based smart contract, a firewall cybersecurity rule engine based on the cybersecurity score of the at least one electronic link, wherein, in an instance where the cybersecurity score meets or exceeds a cybersecurity score threshold associated with the blockchain-based smart contract, execute the firewall cybersecurity rule engine to disallow access to the at least one electronic link, or wherein, in an instance where the cybersecurity score is below the cybersecurity score threshold associated with the blockchain-based smart contract, execute the firewall cybersecurity rule engine to allow access to the at least one electronic link.

10. The computer program product of claim 9, wherein the processing device is configured to cause the processor to perform the following operations:

access, based on the at least one electronic link, a baseline webpage at a current time;

collect at least one baseline webpage telemetry data based on the accessing the baseline webpage; and generate the at least one baseline webpage rendering based on the at least one baseline webpage telemetry data.

11. The computer program product of claim 9, wherein the webpage anomaly detection model is a long short-term memory (LSTM) neural network.

12. The computer program product of claim 9, wherein the at least one electronic link is at least one hyperlink.

13. The computer program product of claim 9, wherein the processing device is configured to cause the processor to perform the following operations:

parse data of the at least one electronic communication, wherein the data of the at least one electronic communication comprises text data;

identify the at least one electronic link within the text data;

intercept, based on the identifying of the at least one electronic link within the text data, the at least one electronic communication; and route, based on the interception, the at least one electronic communication to the cybersecurity analyzer sandbox.

14. A computer implemented method for improving cybersecurity by using webpage rendering telemetry to detect webpage anomalies, the computer implemented method comprising:

identifying at least one electronic communication, wherein the at least one electronic communication comprises at least one electronic link;

routing the at least one electronic communication to a cybersecurity analyzer sandbox;

constructing, by the cybersecurity analyzer sandbox, a webpage rendering based on the at least one electronic link;

collecting, by the cybersecurity analyzer sandbox, at least one webpage telemetry data associated with the webpage rendering;

collecting, by the cybersecurity analyzer sandbox, at least one webpage rendering type data associated with the webpage rendering;

identifying at least one baseline webpage rendering, wherein the at least one baseline webpage rendering comprises at least one baseline telemetry data or at least one baseline rendering type data associated with the at least one electronic link;

applying at least one of the at least one webpage telemetry data or the at least one webpage rendering type data and the at least one baseline webpage rendering to a webpage anomaly detection model;

generating, by the webpage anomaly detection model, a cybersecurity score of the at least one electronic link;

generate a blockchain-based smart contract associated with the webpage anomaly detection model, wherein the blockchain-based smart contract is based on the cybersecurity score of the at least one electronic link; and execute, based on the blockchain-based smart contract, a firewall cybersecurity rule engine based on the cyber-security score of the at least one electronic link, wherein, in an instance where the cybersecurity score meets or exceeds a cybersecurity score threshold associated with the blockchain-based smart contract, execute the firewall cybersecurity rule engine to disallow access to the at least one electronic link, or wherein, in an instance where the cybersecurity score is below the cybersecurity score threshold associated with the blockchain-based smart contract, execute the fire-wall cybersecurity rule engine to allow access to the at least one electronic link.

15. The computer implemented method of claim 14, the computer implemented method comprising:

accessing, based on the at least one electronic link, a baseline webpage at a current time;

collecting at least one baseline webpage telemetry data based on the accessing the baseline webpage; and generating the at least one baseline webpage rendering based on the at least one baseline webpage telemetry data.

16. The computer implemented method of claim 14, wherein the webpage anomaly detection model is a long short-term memory (LSTM) neural network.

17. The computer implemented method of claim 14, wherein the at least one electronic link is at least one hyperlink.

18. The computer implemented method of claim 14, the computer implemented method comprising:

parsing data of the at least one electronic communication, wherein the data of the at least one electronic commu-nication comprises text data;

identifying the at least one electronic link within the text data;

intercepting, based on the identifying of the at least one electronic link within the text data, the at least one electronic communication; and routing, based on the interception, the at least one elec-tronic communication to the cybersecurity analyzer sandbox.

* * * * *